Patented Dec. 23, 1947

2,433,062

UNITED STATES PATENT OFFICE 2,433,062

LACQUERS CONTAINING VINYL RESINS AND PHENOLIC RESINS

Edward C. Pfeffer, Jr., Oak Park, and Franklin M. de Beers, Jr., Evanston, Ill., assignors to Continental Can Company, Inc., New York, N. Y., a corporation of New York No Drawing. Application October 11, 1941, Serial No. 414,678

2 Claims. (Cl. 260—43)

1

This invention relates to the art of providing protective and decorative lacquers, enamels, and coatings upon metal surfaces.

In the co-pending application of Maier, Flugge & Pfeffer, Serial No. 334,602, filed May 11, 1940, Patented July 31, 1945, No. 2,380,456, this art is described in relationship to obtaining compatibility between vinyl resins and drying oils for obtaining stratified coatings, by employment of an oil-soluble and vinyl-resin-compatible varnish resin.

As will be set out hereinafter, it has also been found possible to bring together vinyl resin and phenol-aldehyde resins under restricted conditions of selection and proportion of ingredients, for obtaining stratified coatings upon metal surfaces.

It has heretofore been a practice to employ coatings of vinyl resins (for example, such as formed by the co-polymerization of vinyl chloride and vinyl acetate), but difficulty has been experienced because of the inability of these types of resins to adhere satisfactorily to metal and like surfaces. Coating compositions which rely upon such vinyl resins as a base cannot be successfully baked on most bare metal surfaces to obtain satisfactory adherent coatings, as the vinyl resin itself begins to decompose at such baking temperatures as are necessary to activate the molecules to obtain good adhesion.

Hence, it has been the custom in applying such vinyl resins to metal to first apply a sizing or undercoat to the metal surface to which the vinyl resin can then be applied and made to adhere by baking, without the usual decomposition of the vinyl resin. This requires two coating operations, and any imperfections in the base coat allow contact of the metal surface and the coating of vinyl resin permitting degradation or decomposition of the vinyl resin at such points during baking: even with all the precautions which can be taken in producing these two-coat enameled metal surfaces, cleavage between the layers often occurs, either during fabrication or during subsequent use of the fabricated article.

Adhesive, continuous, solvent- and moisture-resistant films on metal surfaces can be produced by the application in solvent solution and baking thereon of thin films of thermosetting, heat-reactive resins of the phenol-formaldehyde type; for example, such as are formed by the reaction of phenol and formaldehyde under the influence of alkaline catalysts such as ammonia, but such films do not have the desired flexibility and fabrication ability for the manufacture of metal containers, and moreover, such films in many cases impart an undesirable flavor to certain food products packed in metal containers. Therefore it would be desirable if the excellent fabrication ability and the excellent flavor characteristics of vinyl resins could be combined with the desirable properties of the thermosetting phenolic resin films, which are the extreme moisture resistance, solvent resistance, and chemical resistance of this latter type of film after complete polymerization. It has not been considered heretofore that such phenol-formaldehyde thermosetting resins were compatible with vinyl resins. Difficulty has been encountered in preparing a simple coating which has the merits of such thermosetting phenolic resin films in proper adhesion to the base metal and of the vinyl resins in providing an external surface which is non-brittle, flexible, tough, strong and resistant to contacting media such as acid, alkalies, and oils which may be present in foodstuffs, for example.

It has now been found that excellent single-coating compositions and protective films may be prepared by effecting compatibility of certain vinyl resins and thermosetting phenolic resins by the use of a third component compatible with both the thermosetting phenolic resin and the vinyl resin. Such single coating compositions may be applied upon metal surfaces to produce a film wherein the components have a differential concentration effect because the different components tend to assume preferred positions with respect to the metal so that the final film consists essentially of thermosetting phenolic resin adjacent to the metal surface and essentially of the selected vinyl resin at the exposed surface. In such a stratified film, produced by a single application, the thermoplastic vinyl resin after baking exists in the same state as before baking whereas the thermosetting phenolic heat-reactive resin has advanced to the insoluble stage because of the heat applied. Thereby, in a single application a nonhomogeneous coating is produced after baking, consisting of a cured thermosetting phenolic resin layer next to the metal with a thermoplastic vinyl resin layer forming the exposed surface. The nonhomogeneous, composite film produced after baking has higher moisture resistance and lower moisture permeability than a film of the same vinyl resin alone. It is also more resistant than the same vinyl resin film alone to corrosive influences and protects the underlying metal surface much more effectively and also produces comparably better adhesion of the film by resisting undermining of the film due to corrosion of the metal base.

In tests it has also been found that the baked stratified thermosetting phenolic-vinyl resin film has greater resistance and produces more valuable results in some instances than the same vinyl resin applied as a separate coating upon an undercoat.

The vinyl resin selected should have the proper characteristics of resistance to chemical and mechanical influences, and we have found that vinylpolymer resins produced by the polymerization of vinyl chloride, or by co-polymerization of vinyl chloride and vinyl acetate, or by appropriate mixing of separately polymerized vinyl chloride and vinyl acetate, are suitable for employment. In general, the selected vinyl resin consists in part of a polymerized vinyl halide, and may include also a separately or co-polymerized vinyl ester, such as the acetate. Such are referred to herein as vinyl resins.

Theoretically, various organic compounds are considered as being polar in their composition, ranging from a polar neutral condition to strongly polar-negative. This polar condition is revealed by a dipole moment corresponding to the specific attraction or repulsion of electric charges upon or in the particular molecules, and appears as a function of the orientation of the particular molecules, and of the unsymmetrical arrangement of the positive and negative groupings thereof about a center. The degree of positive polarity of the different metals is correlated with the apparent electro-chemical potential of the particular metal. All common synthetic resins of the phenol-formaldehyde group are relatively strongly polar-negative, while the aforesaid selected vinyl resins are in comparison relatively weakly polar-negative. Hence, it may be assumed that the attraction between a polar-negative phenol-formaldehyde resin and a polar-positive metal produces excellent adhesion between the coating and the metal by reason of the electrical charges involved: conversely, the selected vinyl resins are only slightly polar-negative and only little attraction is present so that proper adhesion is not attained. According to the present invention, therefore, a phenol-formaldehyde thermosetting resin is employed in combination with the selected vinyl resin, which thermosetting phenolic resin is selected and compounded to afford a surface to which the selected vinyl resin may firmly adhere. The thermosetting phenolic resin is used in such quantity that it satisfies the polar positive charges of the metal, thus producing excellent adhesion typical of single films of thermosetting phenolic resins on metal surfaces. Furthermore, by presenting conditions during the baking operation under which migration of individual molecules is possible in the coating on the metal, the thermosetting phenolic resin molecules preferentially migrate toward the metal by reason of the selective polar attraction, whereas the vinyl resin molecules are not so attracted and preferentially are displaced outward. Hence, the final film comprises a preponderance of hardened phenol-formaldehyde resin adjacent to the metal, and a preponderance of vinyl resin at the outer surface.

According to the present invention, a coating composition is prepared from three primary ingredients, comprising (1) a thermosetting phenol-formaldehyde, alkali-catalyzed B-stage synthetic resin, (2) a vinyl polymer resin of the aforesaid type, (3) a solvent or other dispersing agent volatile under the conditions of application. A non-heat reactive substituted phenol-formaldehyde acid-catalyzed varnish resin is introduced to assure compatibility between the vinyl resin and the alkali-catalyzed heat-reactive thermosetting phenol-formaldehyde resin.

The composition may be used for coating in various ways, such as by roller, printing, dipping, spraying and brushing operations. It is preferred to employ such dilution by means of the selected solvent, with a proper viscosity, that total solids are present for assuring a coating of the desired thickness by a single application, in order that the differential concentration or stratification effects of the interassociated thermosetting phenolic resin and of the selected vinyl resin may occur to the greatest advantages for the particular employment.

The selection of proportions of thermosetting phenolic resin to vinyl resin depends partly on the character and type of metal surface, partly on the character and thickness of the total film desired, and partly on the limits of compatibility between the thermosetting phenolic resin and the vinyl resin. The quantity of thermosetting phenolic resin should be at least 2% in order to assure proper protection against burning of the vinyl resin and to assure proper adhesion to the metal but preferably does not exceed 40% as a large excess of thermosetting phenolic resin over that required for proper adhesion to the metal represents material which is superfluous, so to speak, and which does not partake in the differential stratification and hence remains with the vinyl ester resin thereby tending to produce a clouded or incompatible film due to the normal incompatibility of these two types of resins.

It is apparently necessary for the thermosetting phenolic resin solids in the film to be sufficient in quantity so that its polar charges are able to satisfy those of the metal and still not to be in such quantity that a great excess of thermosetting phenolic resin remains dispersed in the vinyl layer.

Theoretically, it may be assumed that the action in the coating as applied is initially that of orientation, followed by migration. This migration apparently begins while the solvent is still present in the coating but apparently only a limited migration occurs under such conditions. Hence, the differential concentration or stratification produced by the migration is normally observed to increase largely after the solvents have been substantially eliminated and the film is at an elevated temperature during the baking operation. That is, the migration is occurring in the solvent-free film due to the mobility and decrease in viscosity by reason of the thermoplastic nature of the vinyl resin at the prevailing elevated temperature of the film. This migration apparently continues during the early course of the baking operation while the film is still essentially fluid and mobile, but a result of baking is apparently a fixing in place due to a change in the properties of the thermosetting phenolic resin by reason of its heat reactivity and its advance to the insoluble C-stage. Thereafter migration is completed and further migration is prevented so that the baked film maintains the characteristics thus conferred upon it.

A feature of the present invention is the capability of employing a wide range of temperatures in baking the dried coating to produce a fixed final form. One function of the baking operation is, of course, to remove volatile solvents from the film but another function can be regarded as a continuation or completion of the normal cooking used in making the alkali-catalyzed, thermosetting phenol-formaldehyde resin. Due to the aforesaid apparent migration by which the thermosetting phenolic resin tends to concentrate at the metal surface while the vinyl resin component tends to form an external surface, the thermosetting phenolic resin solids prevent direct contact of vinyl resin with the metal whereby the baking operation does not cause any catalytic decomposition effect by the metal on the vinyl resin and, hence, a much higher maximum temperature and a greater range of temperatures is permissible in this baking operation without objectionable deterioration of the vinyl resin. It is well known that when resins produced by polymerization or co-polymerization of, for example, vinyl chloride and vinyl acetate, are heated or baked at the relatively high temperature necessary to obtain adhesion of these resins to metal, decomposition results by which apparently the chlorine or acetic radical of the polymer reacts with the metal and produces a catalyst in the form of free acid which promotes further decomposition of the vinyl polymer: this is essentially absent in the practice of the present procedure.

When pigments or coloring matters are employed, these can be ground into the vinyl resin or added to the mixed lacquer. Among the coloring matters which may be employed are opaque pigments, transparent pigments, lakes, dyes, and metallic bronzes.

A wide variety of materials may be employed in selecting the several constituents.

(1) The thermosetting phenolic resin constituent consists of an alkali-catalyzed phenol-aldehyde resin advanced in its condensation or polymerization to an intermediate condition in which the resin is yet soluble in selected organic solvents but capable of further reaction, under the influence of heat, into the insoluble or "C" state. The phenol-group in this resin may be unsubstituted phenol, or alkyl-, aryl-, carboxyl-, hydroxyl-, or halogen-substituted phenol. Cresol-aldehyde resins are included in this general definition of phenol-aldehyde resins, with a present preference for the simple cresol resin as distinguished from substituted cresol resins. The preferred aldehyde is formaldehyde itself but in general may be any methylene-containing agent such as formaldehyde, paraformaldehyde, hexamethylene-tetramine, acetaldehyde, etc., which is of proper reactivity to accomplish the conversion. The catalyst used in forming these resins must be of the basic type such as ammonia, caustic soda, sodium carbonate, etc. The resin must be of the type and state of reaction which under the influence of heat will advance to an insoluble stage, but the reaction of producing the resin must be stopped at an unfinished, intermediate stage and the resin taken into the solution in appropriate solvents. The resin in solution should preferably have a rather low viscosity. That is, the resin reaction should be stopped long before the insoluble resin stage is obtained. The basic requirement is that the resin be capable, under the influence of further heat after the elimination of solvent, of advancing to the insoluble, final resin stage.

(2) The non-heat-reactive phenol resin constituent which may be used to promote compatibility of the other two components consists of an acid-catalyzed phenol-aldehyde resin in which the phenol may be an alkyl-, aryl-, carboxyl-, hydroxyl- or halogen-substituted phenol; cresol is included among the phenol compounds capable of forming a suitable acid-catalyzed phenol-aldehyde resin. This resin must be solvent-soluble and compatible both with the thermosetting phenolic resin and with the vinyl resin. The acid-catalyzed phenol-formaldehyde resins are capable of this, as they are permanently fusible and organic-solvent-soluble: being of phenol-formaldehyde type, they are compatible with the thermoset phenol-formaldehyde resins; and, being of acid-catalyst type, are compatible with the vinyl resin.

(3) The vinyl polymer component presently preferred is a co-polymerized resin from 87% vinyl chloride and 13% vinyl acetate, but the vinyl polymer resin may include resins with between 60% and 95% vinyl chloride. Also the physical mixtures of separately manufactured vinyl chloride polymer and vinyl acetate polymer may be used, the resin generally consisting, at least in major part, of a vinyl halide polymer. A general formula for all the substitutes specified is $(CH_2=CAX)_n$ in which X must be, at least in part, a halogen but may consist in part of a monocarboxylic acyloxyl, an alkyl carboxylate radical or a phenyl or substituted phenyl radical and A is hydrogen or a short-chain alkyl group such as methyl, and $n$ denotes polymerization. This also includes such substances as the co-polymers of vinyl chloride with vinyl acetate or esters of acrylic and methacrylic acids with the lower aliphatic alcohols up to n-butyl alcohols. Such are included herein as vinyl polymer resins.

(4) The solvent selected should be capable of forming a common solution of the ingredients, and for this purpose different solvent media may be employed for the ingredients in so far as such solvent media will blend or mix together and carry their respective solutes compatibly into the common mixture. The solvent used must be a solvent for all components, such as the ketones, nitro-paraffins and esters. The aromatic hydrocarbons are satisfactory diluents in many cases. An excellent solvent for these lacquers has been found to be a mixture of 70 parts methyl isobutyl ketone and 30 parts isophorone. Isophorone is a commercially-available stable cyclic ketone with a double bond and is miscible with the usual lacquer solvents and light hydrocarbons and itself is an excellent solvent for various oils, gums and resins. In addition to methyl isobutyl ketone and isophorone, other employable solvents for roll coating include such solvents as cyclohexanone, 2-nitro-paraffin, mesityl oxide, diisobutyl ketone and methyl n-amyl ketone, in combination in some cases with aromatic solvents such as xylol, high flash naphtha or hydrogenated naphtha. For spray coating, methyl isobutyl ketone or a solvent combination of this solvent and toluol can be used.

The preparation of the composition is accomplished by physical blending at room temperature of the selected vinyl resin in appropriate solvents with a solution of the alkali-catalyzed thermosetting phenol-formaldehyde resin. A relatively small quantity of a solution of the non-heat-reactive phenol resin is physically blended with the vinyl resin solution. The quantity of vinyl resin may be varied, say, from 60% to 98% of the total resin solids; the quantity of the alkali-catalyzed thermosetting phenolic resin from 2 to 40% of the total resin solids dependent upon the thermal stability and moisture-resistance required. The quantity of the non-heat-reactive phenol resin is less than 10% of the total resin solids, and is proportioned to the quantity of the particular thermosetting phenolic resin, being used in the amount sufficient to assure compatibility thereof with the vinyl resin: an excessive quantity is to be avoided as it usually has the tendency to cause the resultant composite film to be more brittle.

In employment of the vinyl resin and the thermosetting phenolic resin, the introduction of the acid-catalyzed resin as a compatibilizing agent permits obtaining a coating which adheres excellently, has a non-reactive surface, and does not have a tendency to inter-layer splitting or cleavage. The amount of fusible phenolic resin should never exceed the amount of thermosetting phenolic resin, and usually is present in the basic ratios of 1:10 to 1:3 with respect thereto. This compatibilizing agent is primarily effective in establishing proper compatibility in the solution mixtures, and also has an effect in assuring compatibility in the final coating. When 2 percent of a highly incompatible thermosetting phenolic resin is to be mixed with vinyl resin, up to 2 percent of acid-catalyzed fusible phenolic resin may be introduced as the compatibilizing agent, in order to assure a proper film formation. In general, we have found that cresol-formaldehyde and substituted phenol-aldehyde resins are more compatible than the simple phenol-aldehyde resins, and lesser quantities of compatibilizing agent need be employed therewith.

The thermal stability of the film against decomposition during the baking operation depends largely on the amount of thermosetting phenol-aldehyde resin used in the formula, with the effect of preventing decomposition of the vinyl resin through contact thereof with the metal surface. Thus, a guide in determining the proportion of thermosetting phenolic resin to be used is the degree of thermal stability required. Thus, for a can body which is to be enameled in the flat and then soldered, 30 percent of the thermosetting phenolic resin may be used in the composition; whereas for a can body which is to be spray-lacquered after soldering, and then baked at 315 degrees F., only 5 percent of the thermosetting phenolic resin need be used. A further guide is the degree of processing resistance which is required: where a high process resistance is demanded, a higher quantity of thermosetting phenolic resin, such as 20 to 30 percent, is employed, whereas if the film need only withstand pasteurization temperatures, a lower quantity of thermosetting phenolic resin is employed, such as 4 to 8 percent. The quantity of thermosetting phenolic resin should be sufficient to assure the stability of the vinyl resin, but no substantial excess should be employed since additional amounts serve no useful purpose.

When the three-part mixture of vinyl resin, thermosetting phenolic resin, and compatibilizing agent is to be employed with proper solvents, it has been found that for proper action of the desired quantity of fusible phenolic resin, this compatibilizing resin in solution form must be added to the vinyl resin solution, and only after thorough incorporation thereof should the thermosetting phenolic resin solution be introduced.

In tests of a great number of alkali-catalyzed phenol-aldehyde resins, of both simple phenol and substituted phenol, including cresol, composition, it has been found that all are useful in the present practices and that difficulties in compatibility for particular percentages of the thermosetting phenolic resin can be resolved by employing a permanently-fusible phenol-formaldehyde resin of the acid-catalyzed type.

*Example I*

In a presently preferred preparation, 16 pounds of a co-polymerized vinyl chloride-vinyl acetate resin containing 87% vinyl chloride polymer and 13% vinyl acetate polymer is dissolved in 24 pounds of isophorone and 50 pounds of methyl isobutyl ketone to produce 90 pounds of vinyl resin solution. To this is added 2½ pounds of a solution consisting of 1 pound of an acid-catalyzed phenyl-phenol-formaldehyde non-heat-hardening varnish resin dissolved in 1½ pounds of methyl isobutyl ketone. To the above mixture is added 7½ pounds of a solution of alkali-catalyzed phenol-formaldehyde heat-hardening resin, consisting of 40% resin solids by weight and 60% methyl isobutyl ketone by weight. The above solution is a lacquer adapted for application to metal surfaces in normal manners and must be baked after application to remove the solvent and to cure the thermosetting phenolic resin to produce good adhesion and resistance. The film on metal surfaces may be baked at temperatures between 340° and 400° F., with the upper limit of baking range determined by the uncatalyzed thermal decomposition of the vinyl resin and the lower limit by insufficient adhesion and resistance of the lacquer film.

This lacquer when applied on clean deoxidized steel plate at 3.0 milligrams per square inch and baked at 385° F. for 17 minutes total time, produces a colorless film with excellent adhesion for use on the inside of crown caps. By way of comparison, crown caps fabricated from this coated plate material have been crimped on bottles and cans, pasteurized at 140° F. for 20 minutes and then kept immersed in water for seven days without loss of lacquer adhesion: whereas the usual lacquers or varnishes, including unmodified vinyl ester-halide polymer lacquers, lose adhesion to the steel plate after such treatment. This valuable capability is ascribed to the excellent fabrication characteristics of the poly-vinyl resin combined with the high moisture and alkali resistance of the thermoset phenolic resin.

*Example II*

In another preferred preparation 16 pounds of the same vinyl resin is dissolved in 24 pounds of isophorone and 51.6 pounds of methyl isobutyl ketone to produce 91.6 pounds of vinyl resin solution. To this is added 2½ pounds of the same phenyl-phenol-formaldehyde resin solution prepared as in Example I. Then to the above mixed solution is added 6.9 pounds of a solution of alkali-catalyzed phenol-formaldehyde heat-hardening resin, consisting of 43.5% by weight of resin solids and 56.5% by weight of methyl isobutyl ketone. This lacquer is applied to metals and baked as shown in Example I.

*Example III*

A lacquer which will produce a practically colorless film on metal surfaces is prepared by dissolving 17.4 pounds of the vinyl resin used in Example I in 24.0 pounds of isophorone and 52.1 pounds of methyl isobutyl ketone to produce 93.5 pounds of vinyl resin solution. To this is added 0.6 pound of the acid-catalyzed phenyl-phenol-formaldehyde permanently fusible varnish resin used in Example I, dissolved in 0.9 pound of methyl isobutyl ketone. To this mixed solution is then added 5.0 pounds of the solution of alkali-catalyzed phenol-formaldehyde heat-hardening resin solution used in Example I. This lacquer may be applied and baked as shown in Example I.

This lacquer can be employed for crown caps. It is more flexible than that of Example I, but does not have as strong an adhesion after pasteurization; and hence it is preferably employed for containers which are not subjected to temperatures as high as pasteurization.

*Example IV*

A lacquer suitable for spray application may be made by dissolving 16.0 pounds of the vinyl chloride-vinyl acetate co-polymer resin used in Example I in 74.0 pounds of methyl isobutyl ketone and adding to this solution, first a solution of 1 pound of the phenyl-phenol-formaldehyde resin in 1.5 pounds of methyl isobutyl ketone and then adding to this mixed solution 7.5 pounds of the phenol-formaldehyde heat-hardening resin solution used in Example I. After spray application the lacquer should be baked at a temperature between 350° F. and 390° F. to develop adhesion and moisture resistance.

This lacquer can be sprayed on the inside of clean container bodies made of deoxidized steel plate, at 4.0 to 5.0 milligrams per square inch and then baked at 385° F. for 17 minutes total time. When such a container is filled with beer and capped by a crown cap having a lacquer in accordance with Example I, the resistance to the commodity under the necessary conditions of processing and storage shows that the body lacquer has improved adhesion over the usual lacquers and enamels, including the unmodified poly-vinyl lacquers. The optimum baking temperature of substantially 385° F. for this spray lacquer restricts its use to spraying operations on drawn shells, welded can bodies, or can bodies having side seams secured by silver-lead solder or other high-melting securing material.

*Example V*

To 100 pounds of the clear lacquer, produced as shown in Example I, is added 0.1 pound of brown dye to obtain a clear gold lacquer. This lacquer may be applied to metal surfaces and baked to produce a lacquer with a distinct gold color. This lacquer may be applied to clean deoxidized steel plate and fabricated into crown caps which retain excellent color and appearance.

*Example VI*

To 100 pounds of the clear lacquer, produced as shown in Example I, is added 2.0 pounds of extra fine lining aluminum powder and 2.0 pounds of propylene oxide as a stabilizer against gelation and darkening of the aluminum powder. This results in an aluminum lacquer of the non-leafing type with excellent hiding power, process resistance, fabrication properties and resistance to corrosion.

This lacquer, when applied and baked on clean deoxidized steel plate, provides a structure which can be fabricated into crown caps of attractive appearance and great mechanical and chemical resistance.

*Example VII*

A gold lacquer with excellent light resistance is produced as follows: 40.0 pounds of a yellow lake pigment is dispersed on a two-roll differential grinding mill in 45.0 pounds of the vinyl chloride-vinyl acetate co-polymer resin used in Example I, softened with 15.0 pounds of isophorone. A gold vinyl solution is then made by dissolving 8.15 pounds of the vinyl-pigment mixture produced above and 12.33 pounds of the same vinyl resin in 22.78 pounds of isophorone and 50.00 pounds of methyl isobutyl ketone. This produces 93.26 pounds of a gold vinyl lacquer. To this is added 1.0 pound of the phenyl-phenol-formaldehyde permanently fusible varnish resin used in Example I dissolved in 1.5 pounds of methyl isobutyl ketone. To this mixed solution is then added 7.5 pounds of the alkali-catalyzed phenol-formaldehyde heat-hardening resin solution used in Example I and the final mixture is agitated vigorously for thorough mixing. This gold lacquer may be applied in all normal ways, but is particularly adapted to roller coating to produce a thermally stable film which is baked at 340° to 390° F. to produce a film with excellent adhesion.

There may be substituted other spray-dried co-polymer resins from approximately 87% vinyl chloride and 13% vinyl acetate. Mixed separately polymerized vinyl resins containing large percentages of vinyl halide polymer can be utilized, when care is taken to assure solubility of the resin and to avoid excessively high viscosities.

In the above examples, the acid-catalyzed non-heat-hardening varnish resin of phenol-formaldehyde type may be replaced by other phenol-aldehyde resins of this acid-catalyzed and permanently-fusible type, for effecting the compatibility where necessary.

Instances of special employment have been set up, in certain of the detailed examples, but it will be understood that the various compositions can be employed largely in the art. Examples I, II, III, VI and VII are employable in crown caps, which require bending of the material in fabrication, and further bending in the act of applying. They also produce very good results when used on the inner or outer surfaces of cone tops and dome bottoms of beverage containers made from deoxidized steel plate.

In general, many of the appropriately compounded lacquers of the described type withstand boiling water or even higher processing temperature conditions in the presence of water or steam without the development of a water blush in the lacquer film.

Other solvent mixtures and other dye-stuffs may be introduced. While isophorone is a highly valuable solvent for roll-coating work, and ketones are normally the most suitable solvents for vinyl resins, it is feasible to provide solvent mixtures which do not contain ketones by employing a solvent comprising a single ingredient capable of producing the joint solution, or comprised of separate ingredients which are miscible and which individually are capable of dissolving the vinyl resins and the phenol-aldehyde resins. Thus, nitro-paraffin solvents or ester solvents can be employed in lieu of ketones for dissolving the vinyl resin. Cyclohexanone is a substitute for isophorone in roll-coating work. In the manufacture of spray lacquers, more volatile solvents are preferred, such as hexone and methyl-ethyl ketone.

In preparing colored lacquers, the dye-stuff should be soluble in the solvent employed, in order to obtain a uniform coloring effect.

It is obvious that the invention is not limited solely to the forms of practice set out, but that it may be employed in many ways within the scope of the appended claims.

We claim:

1. A coating composition comprising a volatile organic solvent having dissolved therein a vinyl polymer resin and a thermosetting phenol-aldehyde resin normally incompatible with said polymer resin, said vinyl polymer resin being selected from the group consisting of the copolymers and mixed polymers of vinyl halide and vinyl acetate containing 60 to 95 per cent of vinyl halide and the remainder vinyl acetate, said thermosetting phenol-aldehyde resin being in an intermediate yet-soluble stage, together with an acid-catalyzed permanently-fusible phenol-aldehyde resin for effecting compatability between the vinyl polymer resin and the thermosetting phenolic resin, the proportion of thermosetting phenolic resin being between 2 and 40 percent of the total resin solids and the proportion of the permanently fusible phenolic resin being at least one-tenth of the amount of said thermosetting resin and less than 10 percent of the total resin solids and not exceeding the amount of said thermosetting resin and capable of assuring compatability between the thermosetting resin and the vinyl polymer resin, the remainder being substantially vinyl polymer resin.

2. An article resistant to the action of water at pasteurizing temperatures comprising a base having a metal surface and thereon a unitary protective film consisting of the stratified baked residue of a coating composition comprising a compatible solution in a volatile organic solvent of vinyl polymer and phenolic resins; said vinyl polymer resin being a copolymer of vinyl chloride and vinyl acetate only, the vinyl chloride component providing from 60 to 95 percent of the polymer; said phenolic resins consisting of an alkali-catalyzed thermosetting phenol-aldehyde resin which is in an intermediate yet-soluble stage in an amount from 2 to 40 percent by weight of the total resin solids in the said film and normally incompatible with the vinyl resin in the selected proportions, and of an acid-catalyzed permanently-fusible phenylphenol-formaldehyde resin compatible with the vinyl polymer resin and with the thermosetting phenolic resin, the amount of permanently fusible phenolic resin being at least one-tenth of the amount by weight of said thermosetting phenolic resin, less than 10% of the total resin solids and not exceeding the amount of said thermosetting resin and effective for establishing compatibility between the vinyl polymer resin and the thermosetting resin, the remainder of the total resin solids being essentially vinyl polymer resin; said stratified baked film having a metal-contacting and metal-adherent surface characteristic of the thermosetting resin and having an exposed surface characteristic of the vinyl polymer resin.

FRANKLIN M. DE BEERS, JR.
EDWARD C. PFEFFER, JR.

REFERENCES CITED

The following references are of record in the file of this patent:

UNITED STATES PATENTS

| Number | Name | Date |
|---|---|---|
| 2,270,662 | Raney | Jan. 20, 1942 |
| 2,069,983 | Ubben | Feb. 9, 1937 |
| 2,057,690 | Moss | Oct. 20, 1936 |
| 2,195,254 | Miller | Mar. 26, 1940 |
| 2,302,557 | Langkammerer | Nov. 17, 1942 |
| 2,310,889 | Becker | Feb. 9, 1943 |
| 2,321,783 | Webber et al. | June 15, 1943 |
| 2,293,413 | Stoner et al. | Aug. 18, 1942 |
| 2,052,093 | Honel | Aug. 25, 1936 |

FOREIGN PATENTS

| Number | Country | Date |
|---|---|---|
| 492,906 | Great Britain | Sept. 29, 1938 |

OTHER REFERENCES

"Vinylite Resins—Series V Resins for Surface Coatings," Pub. 1940, by Carbide & Carbon Chem. Corp., page 11.

"Vinylite Resins—General Properties and Uses," pub. 1937, by Carbide and Carbon Chem. Corp., page 6.

Baekeland, pages 155 and 156, Ind. & Eng. Chem., March, 1909.